(12) United States Patent
Li et al.

(10) Patent No.: US 11,926,004 B1
(45) Date of Patent: Mar. 12, 2024

(54) ROLLING RING SHRINK FITTING TOOL FOR ROTARY EQUIPMENT

(71) Applicant: ZHONGJIAN WUZHOU ENGINEERING EQUIPMENT CO., LTD, Nanjing (CN)

(72) Inventors: Le Li, Nanjing (CN); Rui Yang, Nanjing (CN); Huaijun Ji, Nanjing (CN); Qianbiao Xu, Nanjing (CN); Haoji Deng, Nanjing (CN); Yongjie Sun, Nanjing (CN); Hong Yang, Nanjing (CN); Yincheng Zhou, Nanjing (CN); Bo Hu, Nanjing (CN); Jie Ren, Nanjing (CN); Lie Wang, Nanjing (CN); Longfei Miao, Nanjing (CN); Hansi Bai, Nanjing (CN); Tiantian Hu, Nanjing (CN); Jinxin Zhao, Nanjing (CN); Yizhuan Qian, Nanjing (CN); Changbao Chen, Nanjing (CN); Xingzheng Yang, Nanjing (CN); Xiaoli Guo, Nanjing (CN); Lihui Du, Nanjing (CN)

(73) Assignee: ZHONGJIAN WUZHOU ENGINEERING EQUIPMENT CO., LTD, Nanjing (CN)

( * ) Notice: Subject to any disclaimer, the term of this patent is extended or adjusted under 35 U.S.C. 154(b) by 0 days.

(21) Appl. No.: 18/519,209

(22) Filed: Nov. 27, 2023

Related U.S. Application Data (63) Continuation of application No. PCT/CN2023/092825, filed on May 8, 2023.

(30) Foreign Application Priority Data

May 9, 2022 (CN) .......................... 202210498479.0

(51) Int. Cl.
*B23P 11/02* (2006.01)

(52) U.S. Cl.
CPC .................................. *B23P 11/025* (2013.01)

(58) Field of Classification Search
CPC .... B66C 1/42; B66C 1/44; B66C 5/00; B66C 19/00; B23P 11/02; B23P 11/025
See application file for complete search history.

(56) References Cited

FOREIGN PATENT DOCUMENTS

| CN | 107984159 A | 5/2018 |
|---|---|---|
| CN | 111791018 A | 10/2020 |
| CN | 213356738 A | 6/2021 |
| CN | 214422109 A | 10/2021 |
| CN | 113788398 A | 12/2021 |

(Continued)

OTHER PUBLICATIONS

ISR of PCT/CN2023/092825, with ISA Written Opinion.

*Primary Examiner* — Lee A Holly
(74) *Attorney, Agent, or Firm* — Zhigang Ma (57) ABSTRACT

The present disclosure discloses a rolling ring shrink fitting tool for rotary equipment, including a lifting frame; a movement slot is formed in a bottom surface of a top of the lifting frame; an output end of a first motor is connected with a main gear; guide rollers are embedded in a lifting seat through bearings; shrink fitting plates are two semicircular structures; lifting lugs are welded on outer sides of the shrink fitting plates; tooth rings are arranged outside the shrink fitting plates; stop rods are fixed on inner walls of the tooth rings; supporting screw rods are embedded at sunken positions on inner walls of the shrink fitting plates through bearings.

7 Claims, 9 Drawing Sheets

(56) References Cited

FOREIGN PATENT DOCUMENTS

| | | |
|---|---|---|
| CN | 114905226 | 8/2022 |
| FR | 2404133 A | 4/1979 |
| KR | 20090111666 A | 10/2009 |

ROLLING RING SHRINK FITTING TOOL FOR ROTARY EQUIPMENT

TECHNICAL FIELD

The present disclosure relates to the technical field of rotary drying equipment, specifically to a rolling ring shrink fitting tool for rotary equipment.

BACKGROUND

A rotary equipment body is equivalent to a giant rotating shaft. A rolling ring serves as a support for rotary equipment. A clearance between the rolling ring and a rolling ring base plate is controlled between 0 mm and 0.21 mm, with an average clearance of only 0 mm to 0.13 mm. To ensure that the clearance meets a mounting requirement, it is necessary to control an outer diameter of the rolling ring base plate between 0 mm and 0.13 mm and to control an inner diameter tolerance of the rolling ring between 0 mm and +0.13 mm. Due to a large diameter and a small clearance of equipment, it is impossible to directly sleeve the equipment with a rolling ring. Most of the existing technologies use a principle of thermal expansion and cold contraction to heat the rolling ring, so that the inner diameter of the rolling ring increases, so that the rolling ring can be smoothly sleeved on the equipment. During the mounting of the rolling ring, using a rolling ring shrink fitting tool is an existing conventional means, but the existing rolling ring shrink fitting tool has the following problems in use:

Due to a large volume of a rotary equipment body, a lifting mechanism needs to be used during shrink fitting of a rolling ring. A heated hot sleeve and rolling ring are lifted to the rotary equipment through the lifting mechanism for sleeving operation. However, the existing rolling ring shrink fitting tool is not convenient to achieve automatic positioning of the rolling ring and the rotary equipment, and the lifting mechanism needs to be manually repeatedly controlled to move the rolling ring, which still cannot achieve better positioning and alignment. At the same time, it is inconvenient to carry out an automatic sleeving operation during sleeving. In most of the technologies, the lifting mechanism is controlled to cooperate with manual pushing. By this method, on the one hand, operators easily get hurt because the rolling ring has a high temperature; and on the other hand, time and labor are wasted because many operators are required to push the rolling ring, and such a problem of difficulty in sleeving due to non-uniform force application easily occurs.

In response to the above problems, an innovative design is urgently needed on the basis of the original rolling ring shrink fitting tool.

SUMMARY

The present disclosure aims to provide a rolling ring shrink fitting tool for rotary equipment, so as to solve the following problems mentioned in the background section: it is not convenient for the existing rolling ring shrink fitting tool to achieve automatic positioning on a rolling ring and rotary equipment and it is not convenient to achieve an automatic sleeving operation.

In order to achieve the above objective, the present disclosure provides the following technical solution: A rolling ring shrink fitting tool for rotary equipment includes a lifting frame; a movement slot is formed in a bottom surface of a top of the lifting frame; a lifting seat is slidably mounted in the movement slot; a first motor is fixedly embedded in the lifting seat; an output end of the first motor is connected with a main gear; pinions are engaged to two sides of the main gear; one end of each pinion is connected with a wind-up roller; wire ropes are wound on the wind-up rollers; guide rollers are embedded in the lifting seat through bearings; movable rollers are elastically slidably embedded in a bottom of the lifting seat through springs;

the rolling ring shrink fitting tool further includes:

shrink fitting plates, wherein the shrink fitting plates are two semicircular structures; protruding positions at tops of the shrink fitting plates are in fastened connection through bolts; lifting lugs are welded on outer sides of the shrink fitting plates; one end of each wire rope is fixed on the lifting lugs; the wire ropes are wound on the guide rollers and the movable rollers; tooth rings are arranged outside the shrink fitting plates; the tooth rings are two halves; stop rods are fixed on inner walls of the tooth rings; one end of each stop rod is located in a stop slot; the stop slots are formed in outer sides of the shrink fitting plates; supporting screw rods are embedded at sunken positions on the inner walls of the shrink fitting plates through bearings; outer ends of the supporting screw rods are connected with bevel gears; the bevel gears are located on the outer side of the shrink fitting plate; positions of the shrink fitting plates located on front and rear sides of the tooth rings are engaged with the tooth rings; inner ends of the supporting screw rods are sleeved with supporting seats through threads; inner ends of the supporting seats are fixed with supporting plates; stop plates are fixed at top edges of the supporting plates; positioning plates are fixed at inner ends of the stop plates on the supporting plates on a rear side; positioning rods are welded on rear sides of the positioning plates; inner ends of the supporting plates are fastened with a rolling ring body; and a second motor, wherein the second motor is fixed on a front end surface of the top of the lifting frame; an output end of the second motor is connected with push screw rods; the push screw rods are mounted in the movement slot through bearings; smooth surfaces of rear ends of the push screw rods penetrate in the lifting seat; front ends of the push screw rods are sleeved with push seats through threads; the push seats abut against and slide in the movement slot; adjustment screw rods are embedded in recesses in bottoms of the push seats; and push plates sleeve the adjustment screw rods through threads.

Preferably, each movable roller has a "T"-shaped cross section, and elastically slides on the bottom of the lifting seat in a limited manner through each spring; and the two movable rollers are symmetrically arranged at the bottom of the lifting seat. When the shrink fitting plates move up to loosen the wire ropes, the movable rollers move under the action of the springs, to ensure that the wire ropes are tightened and a movement space can be reserved for the shrink fitting plates.

Preferably, the stop rods have spherical end portions and are slidably embedded in the stop slots; a diameter of the spherical end portion of each stop rod is greater than a width of an opening of each stop slot; and the stop rods are distributed circumferentially in the tooth rings. The stop rods stably slide in the stop slots, to ensure stable rotations of the tooth rings.

Preferably, the supporting seats abut against and slide in the shrink fitting plates through the supporting screw rods; the supporting seats are distributed in the shrink fitting plates at an equal angle; and the supporting plate at one end of each supporting seat is of an arc-shaped structural design. The tooth rings are rotated to drive the supporting seats and the supporting plates to move through the supporting screw rods to fix rolling rings with different diameters.

Preferably, the positioning rods and the stop plates are perpendicular to each other; each entire positioning rod is of a cylindrical structural design; and an end portion of each positioning rod is of a circular truncated cone structural design. The positioning rods move with the shrink fitting plates to contact an end portion of the rotary equipment, so that automatic positioning of the shrink fitting plates and the rolling ring can be achieved.

Preferably, a cross section of each push seat is of an "L"-shaped structural design; a front section of the push plate at the bottom of each push seat is of an "L"-shaped structural design; and the two push seats are symmetrically arranged on a bottom portion of the top of the lifting frame. The push seats move with the rotation of the push screw rods, can push the lifting seat to move, and cooperate with the push plates to push the shrink fitting plates to move.

Preferably, a top of each adjustment screw rod is connected with a gear sleeve; the gear sleeves are movably embedded in the push seats; one side of each gear sleeve is engaged with a rack; the racks are fixed on a side wall of the movement slot; and the racks are parallel to the push seats. When the push seats move, the gear sleeves are engaged with the racks to drive the push plates to move down, so that an occupied space is reduced while pushing is achieved, which avoids the influence on early operations.

Compared with the prior art, the present disclosure has the following beneficial effects:

1. According to the present disclosure provided with a rolling ring fixing mechanism. By rotating the tooth rings, the bevel gears drive the supporting screw rods to rotate, and then drive the supporting seats and supporting plates to move. The two groups of supporting seats and supporting plates distributed at equal angles clamp and fix the rolling rings of different specifications from the outside. At the same time, an exterior of the rolling ring is stopped by the stop plates to fix the overall rolling ring, to effectively prevent deformation of the exterior of the rolling ring during heating. At the same time, the wire ropes can be fixed with the lifting lugs to directly lift the shrink fitting plate and the rolling ring, facilitating movement and subsequent sleeving of the rolling ring after heating. The stop rods in the tooth rings slide in the stop slots to achieve limited rotation of the tooth rings. The end portions of the tooth rings outside the two shrink fitting plates abut against each other. After the two shrink fitting plates are fixed, the tooth rings form a complete ring. By rotating the tooth rings, multiple supporting plates can move, so that the operation is simple and fast.

2. According to the present disclosure provided with an automatic push mechanism, the second motor drives the push screw rods to rotate, which can drive the push seats to move. The gear sleeves inside the push seats are engaged with the racks, which can drive the adjustment screw rods to rotate. The adjustment screw rods drive the push plates to move down, thereby achieving synchronous movement and downward movement of the push plates, so that the bottoms of the push plates reach both sides of the shrink fitting plates during the movement. In coordination with the continuous movement of the push seats, the shrink fitting plates and rolling ring are pushed by the left and right push plates towards the rotary equipment. At the same time, the end portions of the push seats reach the lifting seat, causing the lifting seat and the shrink fitting plates to move synchronously, to drive the shrink fitting plates and rolling ring to automatically move towards the rotary equipment from the upper portion and the left side, achieving automatic balanced pushing.

3. According to the present disclosure provided with an automatic positioning mechanism. When the shrink fitting plates and the rolling ring are driven to move automatically by the push plates and lifting seat, the inclined truncated-cone-shaped end portions of the positioning rods at the rear ends of the positioning plates located on the stop plates on the rear side contact an end portion of the rotary equipment, and the positions of the shrink fitting plates and the rolling ring can be adaptively adjusted using a force caused by the movement, to achieve automatic positioning and facilitate precise sleeving of the rolling ring, without a need of performing frequent manual operations on the lifting seat to adjust the position of the rolling ring. In addition, the movable rollers that guide the wire ropes elastically slide on the bottom of the lifting seat through the springs. When the shrink fitting plates and the rolling ring are automatically positioned and move the movable rollers elastically slide under the action of the springs, which can tighten the wire ropes. In an initial state, only the shrink fitting plates need to be moved to a position slightly lower than the corresponding rotary equipment. After automatic positioning, a certain movement space can be reserved for the wire ropes, to avoid the tightening of the wire ropes from affecting the automatic positioning of the shrink fitting plates.

4. In summary, by the synchronous movement of the multiple supporting seats and supporting plates, the present disclosure fix rolling rings of different specifications. At the same time, the stop plates are arranged on the supporting plates. Positions of the positioning plates and the positioning rods on the stop plates change with the size of the rolling ring, so that the positioning rods can automatically position rolling rings with different diameters. When the rolling ring is automatically pushed through the push seats and the push plates, the positioning rods can be used to contact the rotary equipment to automatically position the rolling ring, so that when the present disclosure is applied to the rolling rings with different diameters, automatic pushing, positioning, and sleeving can be achieved, to avoid such a phenomenon that alignment cannot be well achieved even if the lifting mechanism is frequently operated and such a problem that it is easy to scale people and cause inaccurate sleeving because many people manually push the rolling ring for sleeving. The principle of thermal expansion and cold contraction is effectively used. The rolling ring body is subjected to shrink fitting, which effectively reduces a clearance between the rolling ring body and rolling ring base plates and improves the mounting accuracy.

In the drawings: lifting frame 1, movement slot 2, lifting seat 3, first motor 4, main gear 5, pinion 6, wind-up roller 7, wire rope 8, guide roller 9, movable roller 10, spring 11, shrink fitting plate 12, lifting lug 13, tooth ring 14, stop rod 15, stop slot 16, supporting screw rod 17, bevel gear 18, supporting seat 19, supporting plate 20, stop plate 21, positioning plate 22, positioning rod 23, rolling ring body 24, second motor 25, push screw rod 26, push seat 27, adjustment screw rod 28, gear sleeve 281, rack 282, and push plate 29.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments. All other embodiments obtained by those of ordinary skill in the art based on the embodiments in the present disclosure without creative work shall fall within the protection scope of the present disclosure.

Figure 1:
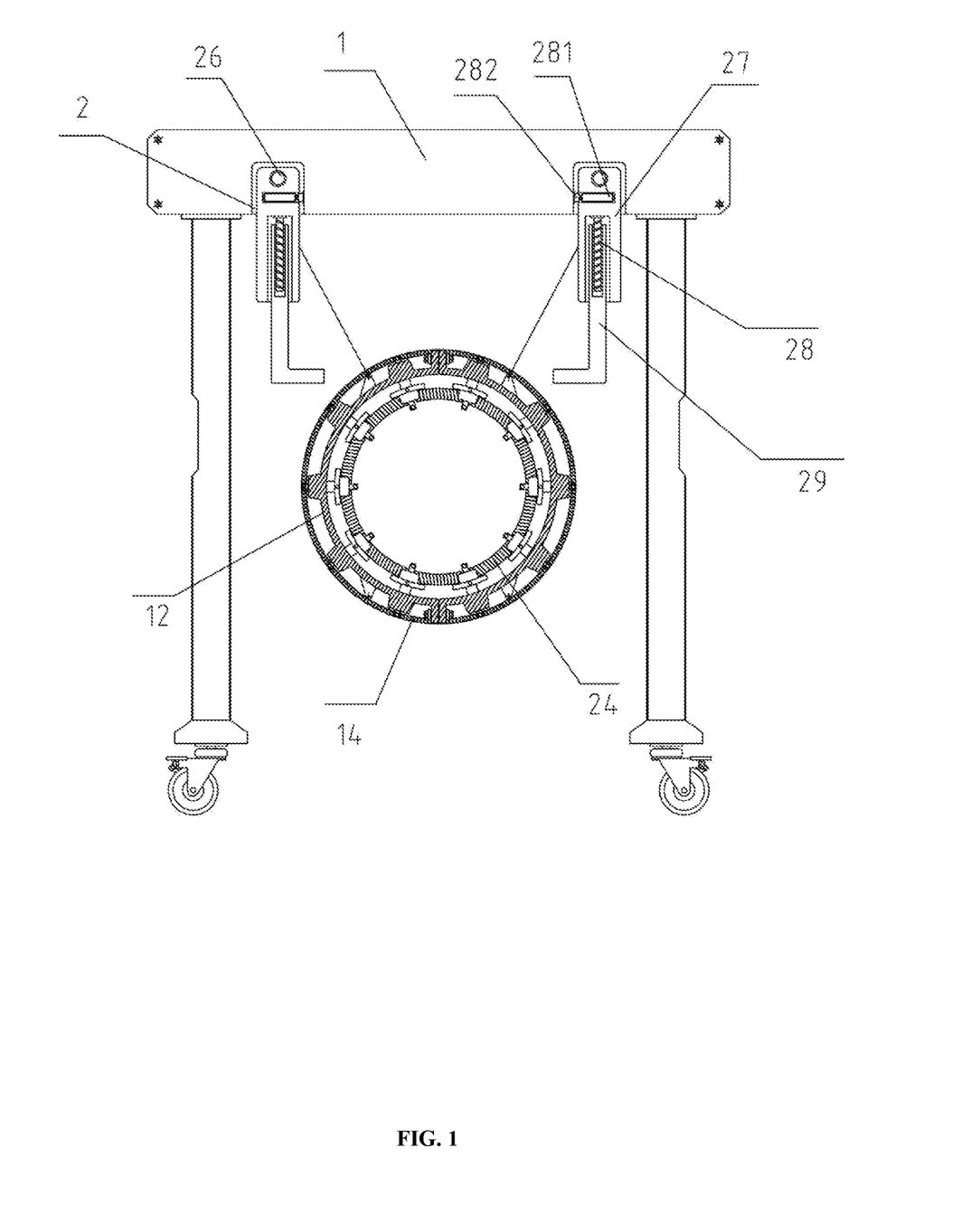
FIG. 1 is a schematic diagram of a front sectional structure of the present disclosure.
Figure 2:
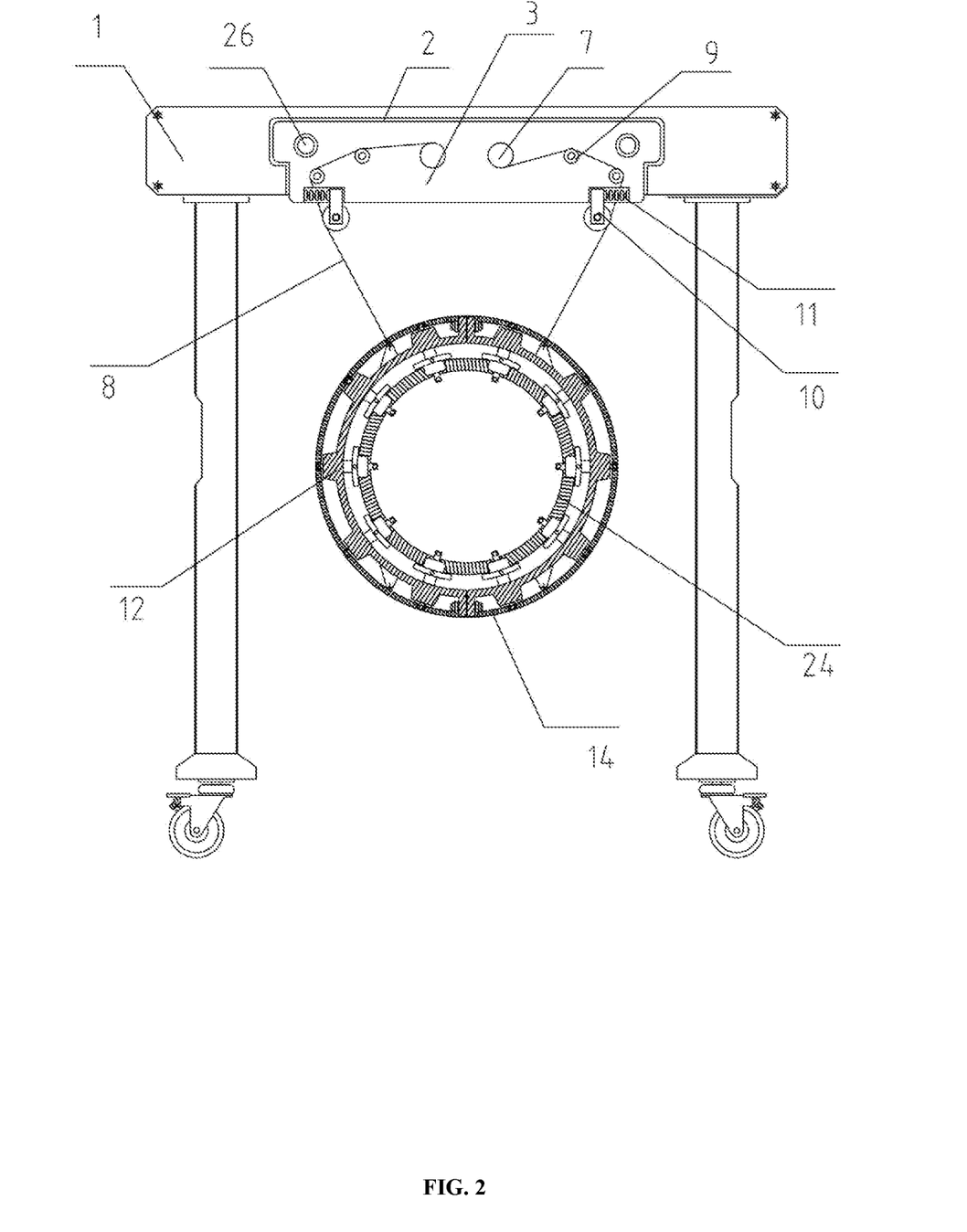
FIG. 2 is a schematic diagram of a front sectional structure of a lifting seat of the present disclosure.
Figure 3:
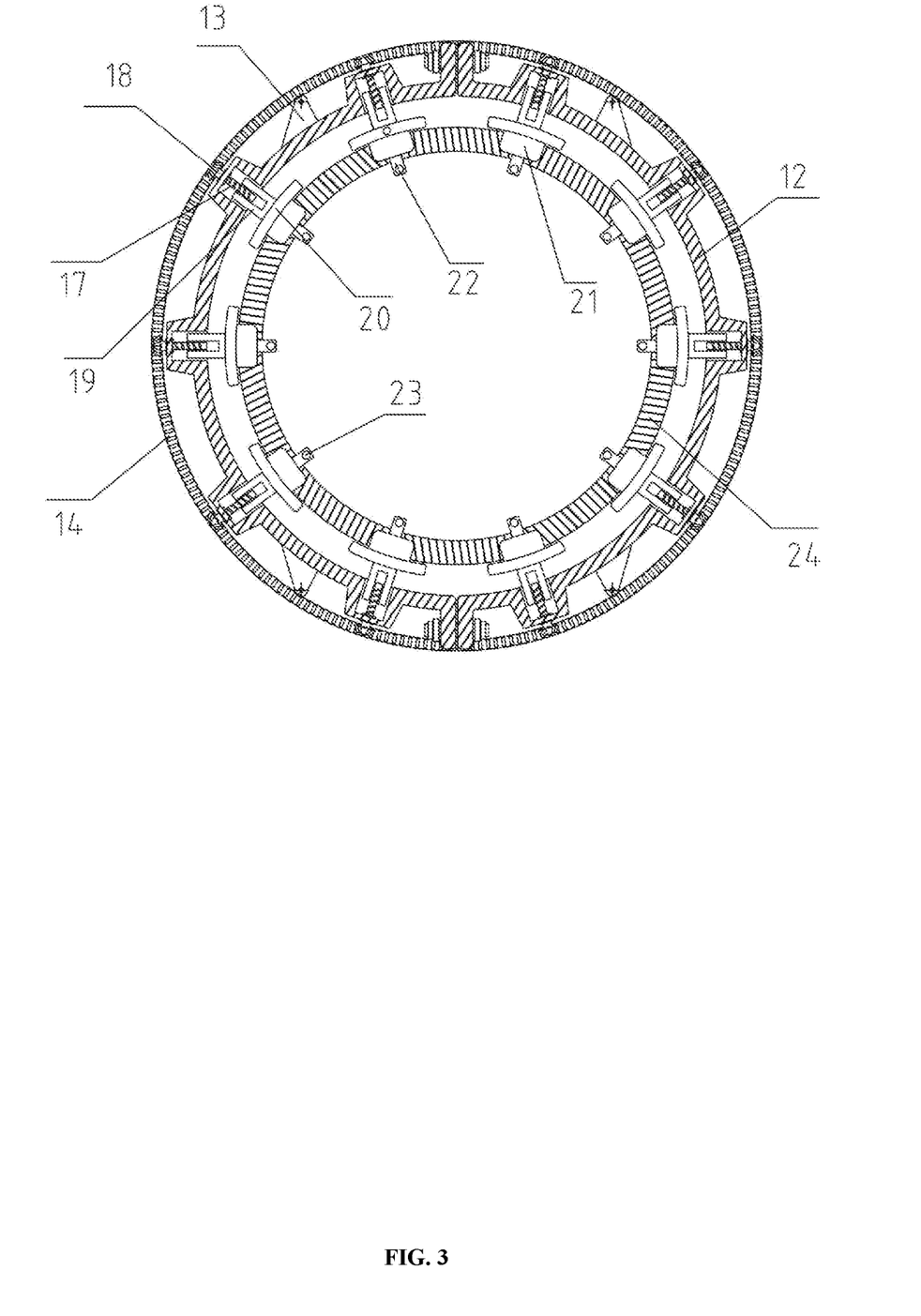
FIG. 3 is a schematic diagram of a front sectional structure of shrink fitting plates of the present disclosure.
Figure 4:
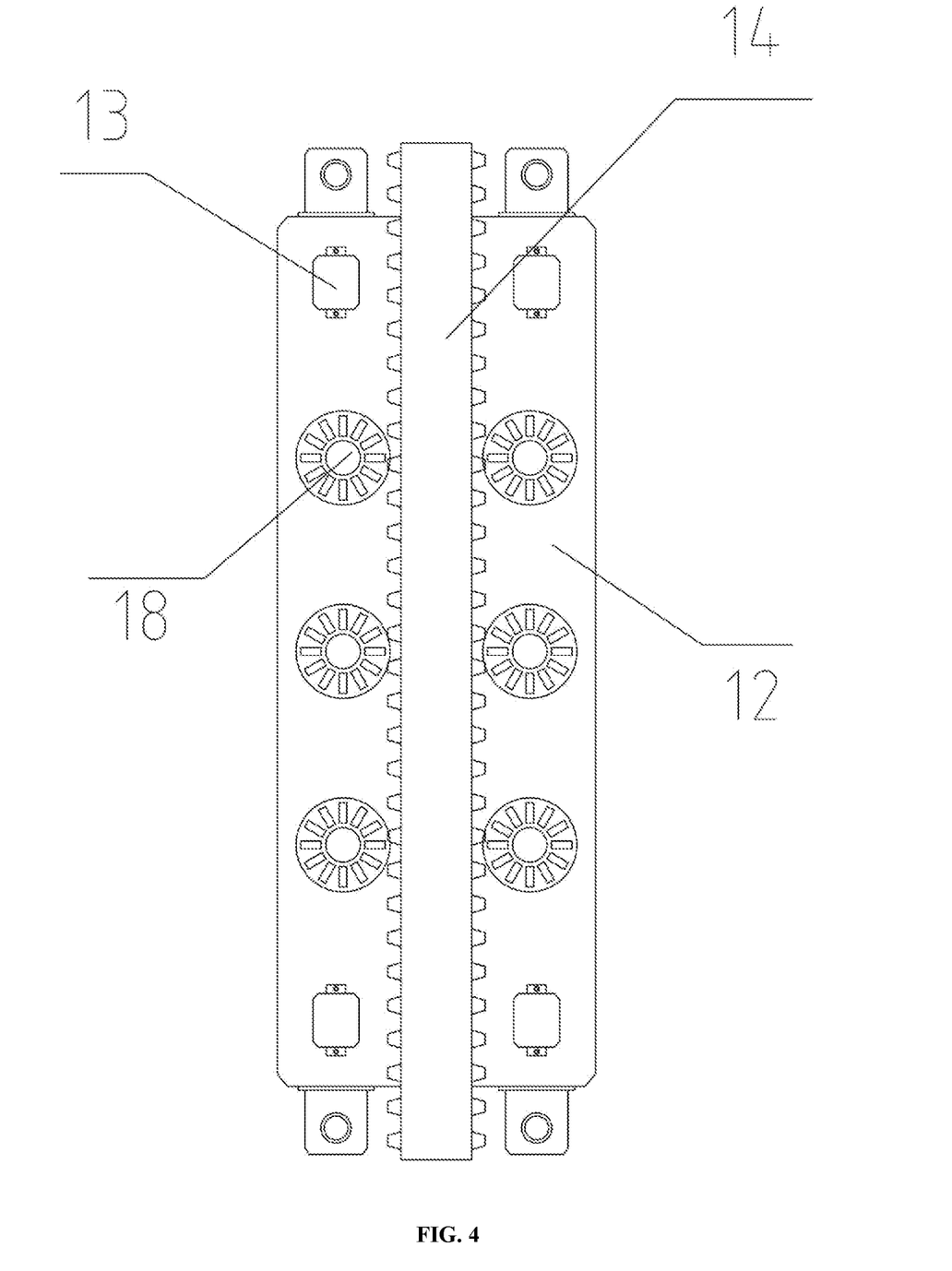
FIG. 4 is a schematic diagram of a side structure of a shrink fitting plate of the present disclosure.
Figure 5:
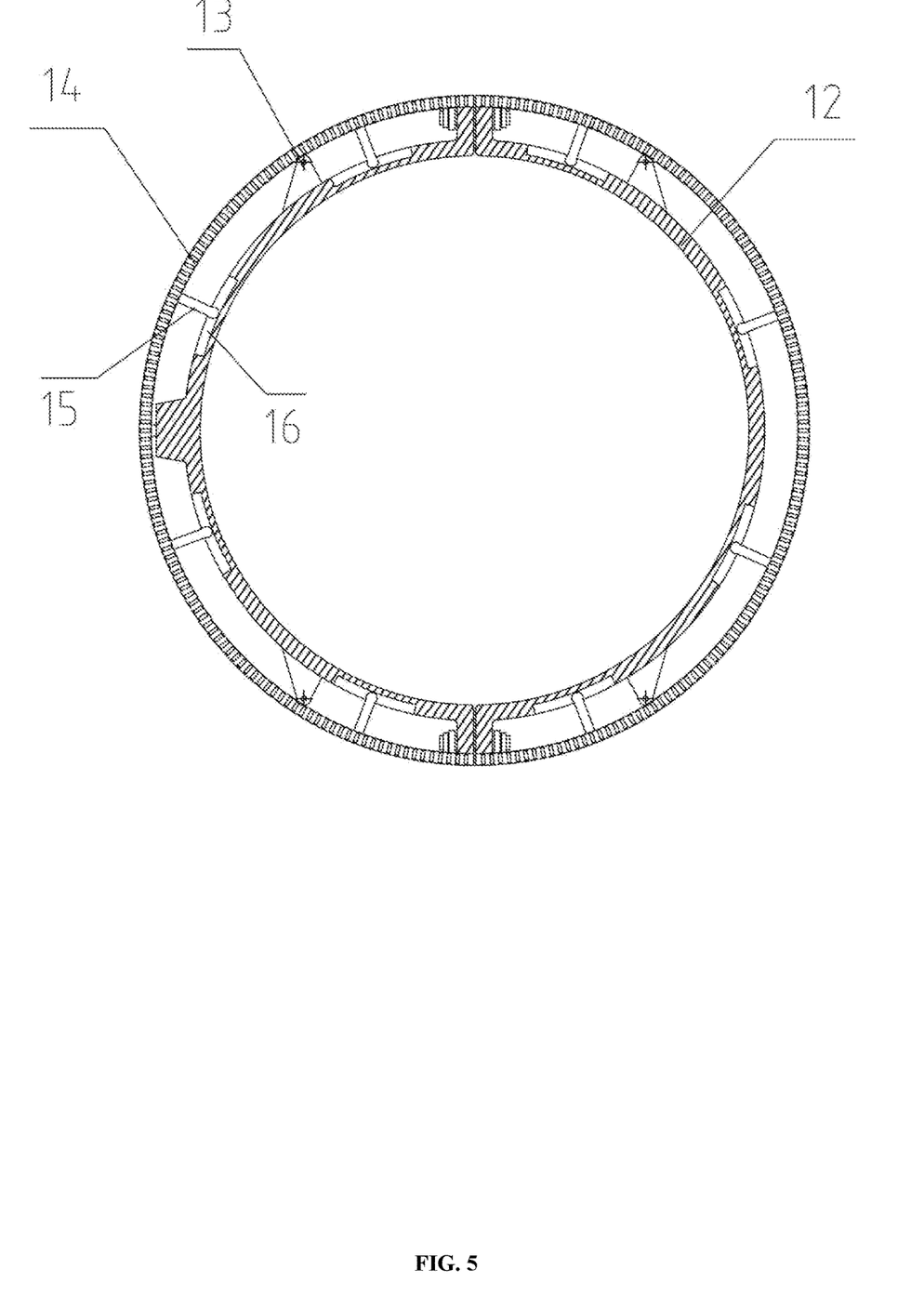
FIG. 5 is a schematic diagram of a front sectional structure of a tooth ring of the present disclosure.
Figure 6:
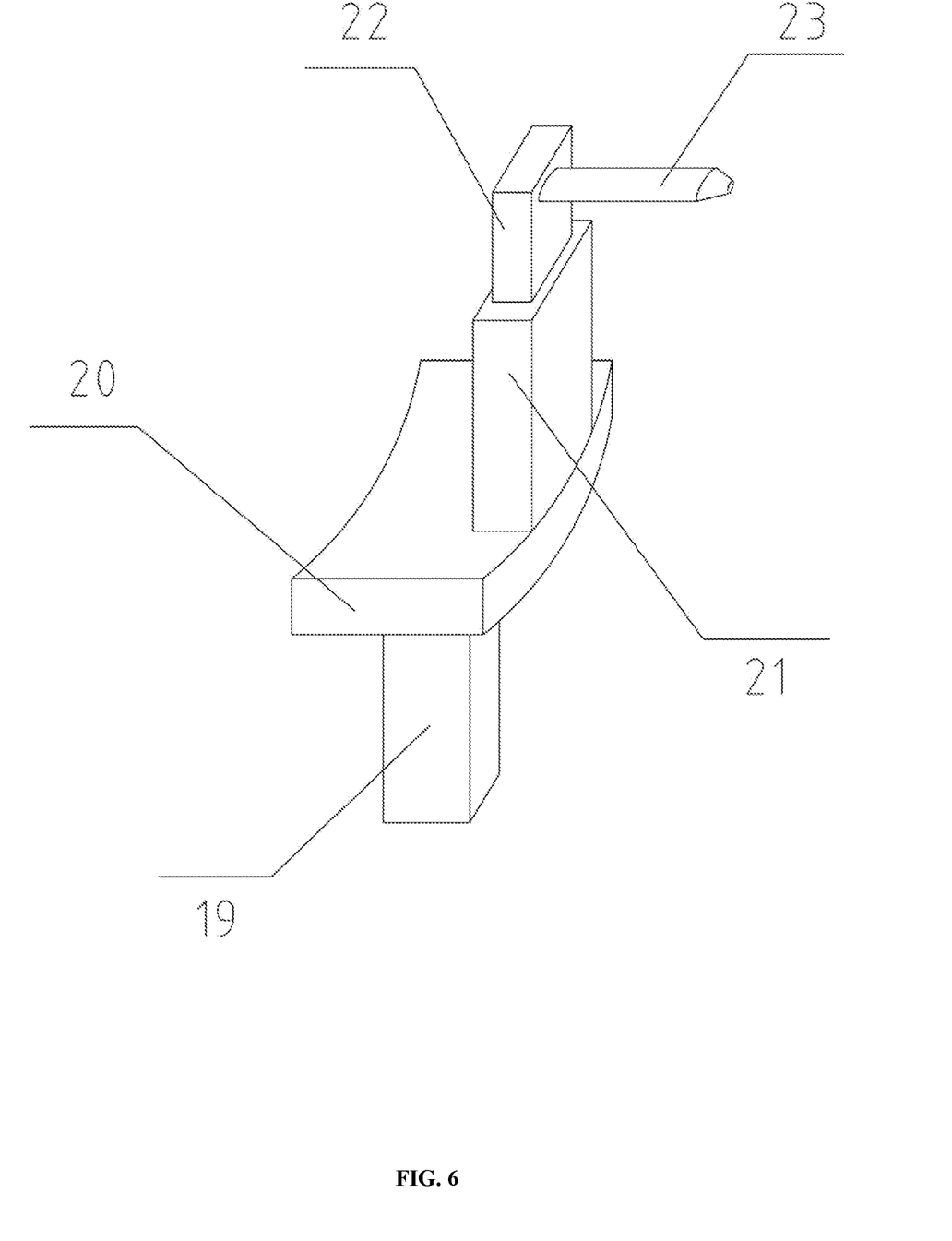
FIG. 6 is a schematic diagram of a three-dimensional structure of a supporting plate of the present disclosure.
Figure 7:
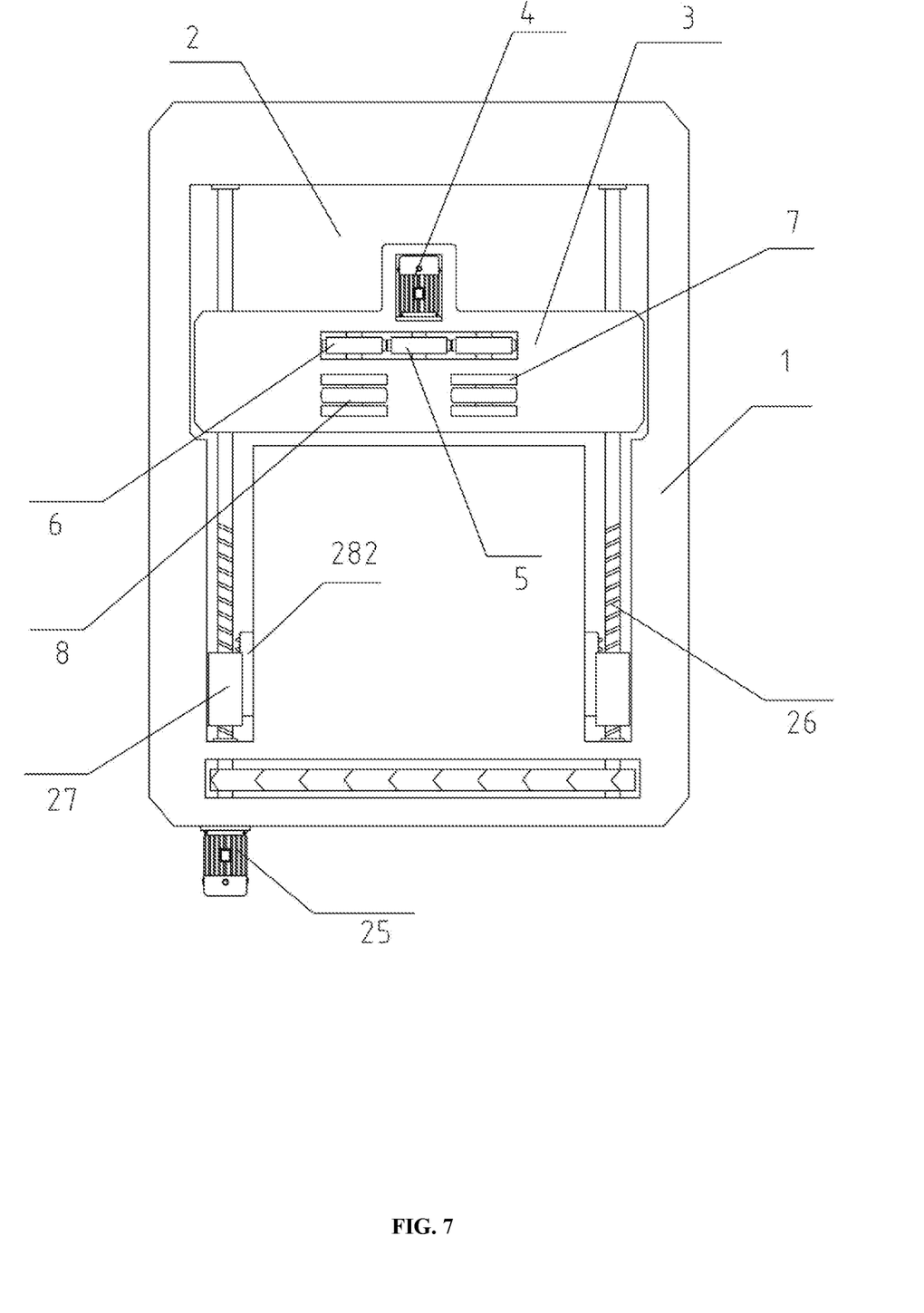
FIG. 7 is a schematic diagram of a top sectional structure of the present disclosure.
Figure 8:
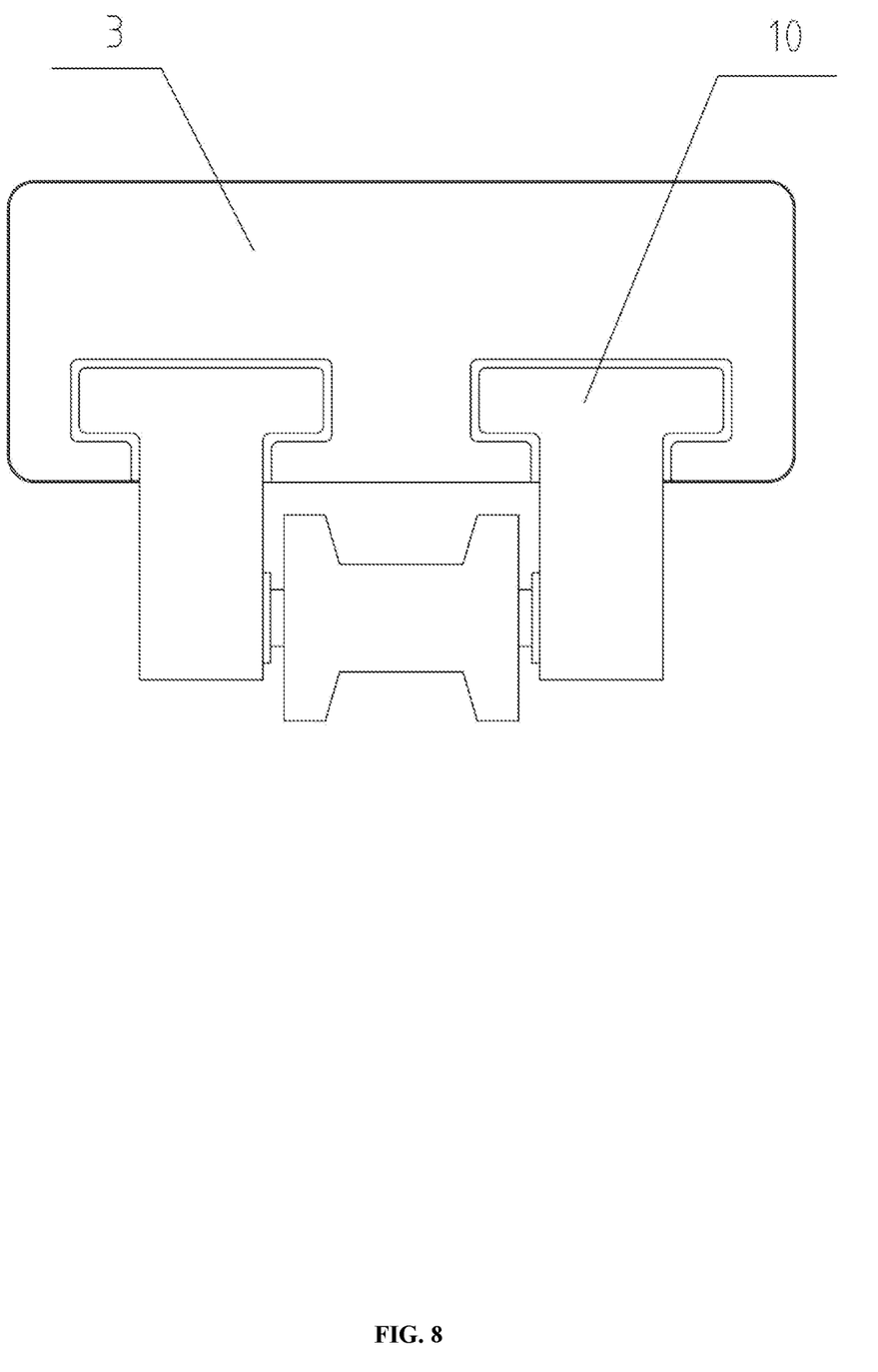
FIG. 8 is a schematic diagram of a side sectional structure of a movable roller of the present disclosure.
Figure 9:
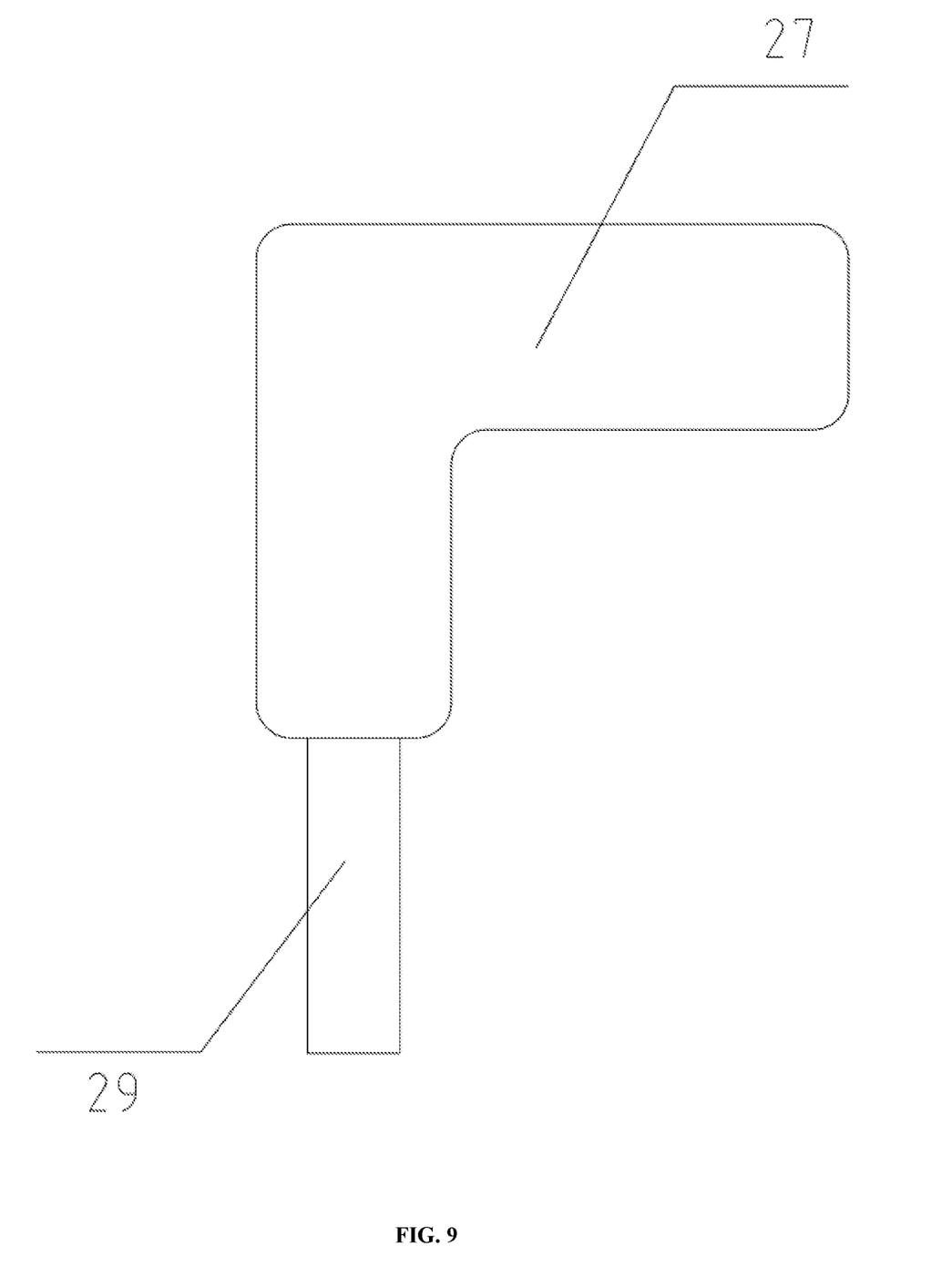
FIG. 9 is a schematic diagram of a side structure of a push seat of the present disclosure.

Referring to FIG. 1 to FIG. 9, the present disclosure provides a technical solution: A rolling ring shrink fitting tool for rotary equipment includes a lifting frame 1, a movement slot 2, a lifting seat 3, a first motor 4, a main gear 5, pinions 6, wind-up rollers 7, wire ropes 8, guide rollers 9, movable rollers 10, springs 11, shrink fitting plates 12, lifting lugs 13, tooth rings 14, stop rods 15, stop slots 16, supporting screw rods 17, bevel gears 18, supporting seats 19, supporting plates 20, stop plates 21, positioning plates 22, positioning rods 23, a rolling ring body 24, a second motor 25, push screw rods 26, push seats 27, adjustment screw rods 28, gear sleeves 281, racks 282, and push plates 29.

Embodiment 1

Referring to FIG. 1 to FIG. 6, a rolling ring shrink fitting tool for rotary equipment includes a lifting frame 1. A movement slot 2 is formed in a bottom surface of a top of the lifting frame 1. A lifting seat 3 is slidably mounted in the movement slot 2. A first motor 4 is fixedly embedded in the lifting seat 3. An output end of the first motor 4 is connected with a main gear 5. Pinions 6 are engaged to two sides of the main gear 5. One end of each pinion 6 is connected with a wind-up roller 7. Wire ropes 8 are wound on the wind-up rollers 7. Guide rollers 9 are embedded in the lifting seat 3 through bearings. Movable rollers 10 are elastically slidably embedded in a bottom of the lifting seat 3 through springs 11. Shrink fitting plates 12 are two semicircular structures. Protruding positions at tops of the two shrink fitting plates 12 are in fastened connection through bolts. Lifting lugs 13 are welded on outer sides of the shrink fitting plates 12; one end of each wire rope 8 is fixed on the lifting lugs 13. The wire ropes 8 are wound on the guide rollers 9 and the movable rollers 10; tooth rings 14 are arranged outside the shrink fitting plates 12; the tooth rings 14 are two halves; stop rods 15 are fixed on inner walls of the tooth rings 14; one end of each stop rod 15 is located in a stop slot 16; the stop slots 16 are formed in outer sides of the shrink fitting plates 12; supporting screw rods 17 are embedded at sunken positions on the inner walls of the shrink fitting plates 12 through bearings; outer ends of the supporting screw rods 17 are connected with bevel gears 18; the bevel gears 18 are located on the outer sides of the shrink fitting plates 12; positions of the shrink fitting plates 12 located on front and rear sides of the tooth rings 14 are engaged with the tooth rings 14; inner ends of the supporting screw rods 17 are sleeved with supporting seats 19 through threads; inner ends of the supporting seats 19 are fixed with supporting plates 20; stop plates 21 are fixed at top edges of the supporting plates 20; and inner ends of the supporting plates 20 are fastened with a rolling ring body 24. The stop rods 15 have spherical end portions and are slidably embedded in the stop slots 16; a diameter of the spherical end portion of each stop rod 15 is greater than a width of an opening of each stop slot 16; and the stop rods 15 are distributed circumferentially in the tooth rings 14. The supporting seats 19 abut against and slide in the shrink fitting plates 12 through the supporting screw rods 17; the supporting seats 19 are distributed in the shrink fitting plates 12 at an equal angle; and the supporting plate 20 at one end of each supporting seat 19 is of an arc-shaped structural design. The two shrink fitting plates 12 sleeve the rolling ring body 24.

The tooth rings 14 are rotated to drive the plurality of supporting seats 19 and supporting plates 20 to move, which cooperate with the stop plates 21 to fixedly sleeve the rolling ring body 24 with the shrink fitting plates 12. The shrink fitting plates 12 and the rolling ring body 24 are transported into a heating furnace for thermal treatment. Then, the shrink fitting plates 12 and the rolling ring body 24 are lifted to a front end of the rotary equipment through the lifting frame 1. The first motor 4 is controlled to operate. Initial positions of the shrink fitting plates 12 and the rolling ring body 24 are adjusted through the wind-up rollers 7 and the wire ropes 8.

Embodiment 2

Referring to FIG. 1 to FIG. 9, the rolling ring shrink fitting tool further includes a second motor 25; the second motor 25 is fixed on a front end surface of the top of the lifting frame 1; an output end of the second motor 25 is connected with push screw rods 26; the push screw rods 26 are mounted in the movement slot 2 through bearings; smooth surfaces of rear ends of the push screw rods 26 penetrate in the lifting seat 3; front ends of the push screw rods 26 are sleeved with push seats 27 through threads; the push seats 27 abut against and slide in the movement slot 2; adjustment screw rods 28 are embedded in recesses in bottoms of the push seats 27; and push plates 29 sleeve the adjustment screw rods 28 through threads. Positioning plates 22 are fixed at inner ends of the stop plates 21 on the supporting plates 20 on a rear side; and positioning rods 23 are welded on rear sides of the positioning plates 22. Each movable roller 10 has a "T"-shaped cross section, and elastically slides on the bottom of the lifting seat 3 in a limited manner through each spring 11; and the two movable rollers 10 are symmetrically arranged at the bottom of the lifting seat 3. The positioning rods 23 and the stop plates 21 are perpendicular to each other; each entire positioning rod 23 is of a cylindrical structural design; an end portion of each positioning rod 23 is of a circular truncated cone structural design; and a cross section of each push seat 27 is of an "L"-shaped structural design. A front section of the push plate 29 at the bottom of each push seat 27 is of an "L"-shaped structural design; and the two push seats 27 are symmetrically arranged on a bottom portion of the top of the lifting frame 1. A top of each adjustment screw rod 28 is connected with a gear sleeve 281; the gear sleeves 281 are movably embedded in the push seats 27; one side of each gear sleeve 281 is engaged with a rack 282; the racks 282 are fixed on a side wall of the movement slot 2; and the racks 282 are parallel to the push seats 27. The second motor 25 is started to drive the push seats 27 to move, causing the push plates 29 to move with the push seats and to move down. The push plates 29 push the shrink fitting plates 12 and the rolling ring body 24 to move towards the rotary equipment, and the push seats 27 push the lifting seat 3 to move synchronously. At the same time, the positioning rods 23 contact the front end of the rotary equipment to adaptively drive the shrink fitting plates 12 and the rolling ring body 24 to move and be concentric with the rotary equipment, achieving automatic shrink fitting.

Working principle: To use the rolling ring shrink fitting tool for the rotary equipment, as shown in FIG. 1 to FIG. 6, the two shrink fitting plates 12 first sleeve the rolling ring body 24, and the two shrink fitting plates 12 are then fixed with the bolts. Then, the tooth rings 14 are rotated. The stop rods 15 in the tooth rings 14 slide along the stop slots 16 to position the tooth rings 14. The tooth rings 14 are engaged with the bevel gears 18 to drive the multiple supporting screw rods 17 to rotate synchronously, and the supporting screw rods 17 drive the supporting seats 19 and the supporting plates 20 to move. The two groups of supporting plates 20 clamp the rolling ring body 24 from the outside. At the same time, cooperation with the stop plates 21 to stop the rolling ring body 24 can fix the rolling ring bodies 24 with different diameters. Then, the shrink fitting plates 12 and the rolling ring body 24 are horizontally placed into the heating furnace for thermal treatment. After the thermal treatment is completed, one end of each wire rope 8 is fixed to two lifting lugs 13. The first motor 4 is started. The first motor 4 drives the pinions 6 to rotate through the main gear 5, thereby driving the two wind-up rollers 7 to rotate, causing the wire ropes 8 to bypass the guide rollers 9 and the movable rollers 10 to pull and lift the shrink fitting plates 12 and move the shrink fitting plates 12 to the front end of the rotary equipment. During shrink fitting, the operation of the first motor 4 is controlled, so that the shrink fitting plates 12 and the rolling ring body 24 are located at a slightly lower position at the front end of the rotary equipment, to reserve a space for the wire ropes 8, which facilitates subsequent positioning and shrink fitting.

Next, as shown in FIG. 1 to FIG. 9, the second motor 25 is started. The second motor 25 drives the push screw rods 26 to rotate, which can drive the push seats 27 to slide in the movement slot 2. During the sliding, the gear sleeves 281 inside the push seats 27 are engaged with the racks 282, which can drive the adjustment screw rods 28 to rotate and then drive the push plates 29 to move down, achieving movement and synchronous downward movement of the push plates 29 until one end of each push plate 29 moves to side positions of the shrink fitting plates 12. At this time, the push seats 27 move to the lifting seat 3. As the push seats 27 continue to move, the lifting seat 3 moves therewith. At the same time, the push plates 29 push the shrink fitting plates 12 and the rolling ring body 24 to move. By performing pushing from both the top and the left and right sides simultaneously, the shrink fitting plates 12 and the rolling ring body 24 are stably pushed. When the positioning rods 23 on the shrink fitting plates 12 move to the front end of the rotary equipment, the positions of the shrink fitting plates 12 and the rolling ring body 24 are adaptively adjusted under the guidance of the inclined planes of the end portions of the positioning rods 23 and the end portion of the rotary equipment. At this time, the wire ropes 8 will be loosened, and the movable rollers 10 are reset under the action of the springs 11. As the push seats 27 continue to move, the shrink fitting plates 12 and the rolling ring body 24 can automatically stably sleeve rolling ring base plates on the rotary equipment. After cooling, a clearance between the rolling ring body 24 and the rolling ring base plates is measured. The rolling ring base plates are fixed at an equal angle, and the positioning rods 23 can be staggered with the rolling ring base plates, without affecting the sleeving of the rolling ring body 24.

Although the present disclosure has been described in detail with reference to the foregoing embodiments, those skilled in the art still can modify the technical solutions disclosed in the foregoing various embodiments, or make equivalent replacement to partial technical features. Any modifications, equivalent replacements, improvements and the like that are made without departing from the spirit and principle of the present disclosure shall all fall within the protection scope of the present disclosure.

What is claimed is:

1. A rolling ring shrink fitting tool for rotary equipment, comprising a lifting frame (1), wherein a movement slot (2) is formed in a bottom surface of a top of the lifting frame (1); a lifting seat (3) is slidably mounted in the movement slot (2); a first motor (4) is fixedly embedded in the lifting seat (3); an output end of the first motor (4) is connected with a main gear (5); pinions (6) are engaged to two sides of the main gear (5); one end of each pinion (6) is connected with a wind-up roller (7); wire ropes (8) are wound on the wind-up rollers (7); guide rollers (9) are embedded in the lifting seat (3) through bearings; movable rollers (10) are elastically slidably embedded in a bottom of the lifting seat (3) through springs (11);

the rolling ring shrink fitting tool further comprises:
shrink fitting plates (12), wherein the shrink fitting plates (12) are two semicircular structures; protruding positions at tops of the two shrink fitting plates (12) are in fastened connection through bolts; lifting lugs (13) are welded on outer sides of the shrink fitting plates (12); one end of each wire rope (8) is fixed on the lifting lugs (13); the wire ropes (8) are wound on the guide rollers (9) and the movable rollers (10); tooth rings (14) are arranged outside the shrink fitting plates (12); the tooth rings (14) are two halves; stop rods (15) are fixed on inner walls of the tooth rings (14); one end of each stop rod (15) is located in a stop slot (16); the stop slots (16) are formed in outer sides of the shrink fitting plates (12);

supporting screw rods (17) are embedded at sunken positions on the inner walls of the shrink fitting plates (12) through bearings; outer ends of the supporting screw rods (17) are connected with bevel gears (18); the bevel gears (18) are located on the outer sides of the shrink fitting plates (12); positions of the shrink fitting plates (12) located on front and rear sides of the tooth rings (14) are engaged with the tooth rings (14); inner ends of the supporting screw rods (17) are sleeved with supporting seats (19) through threads; inner ends of the supporting seats (19) are fixed with supporting plates (20); stop plates (21) are fixed at top edges of the supporting plates (20); positioning plates (22) are fixed at inner ends of the stop plates (21) on the supporting plates (20) on a rear side; positioning rods (23) are welded on rear sides of the positioning plates (22); inner ends of the supporting plates (20) are fastened with a rolling ring body (24); and a second motor (25), wherein the second motor (25) is fixed on a front end surface of the top of the lifting frame (1); an output end of the second motor (25) is connected with push screw rods (26); the push screw rods (26) are mounted in the movement slot (2) through bearings; smooth surfaces of rear ends of the push screw rods (26) penetrate in the lifting seat (3); front ends of the push screw rods (26) are sleeved with push seats (27) through threads; the push seats (27) abut against and slide in the movement slot (2); adjustment screw rods (28) are embedded in recesses in bottoms of the push seats (27); and push plates (29) sleeve the adjustment screw rods (28) through threads.

2. The rolling ring shrink fitting tool for the rotary equipment according to claim 1, wherein each movable roller (10) has a "T"-shaped cross section, and elastically slides on the bottom of the lifting seat (3) in a limited manner through each spring (11); and the two movable rollers (10) are symmetrically arranged at the bottom of the lifting seat (3).

3. The rolling ring shrink fitting tool for the rotary equipment according to claim 1, wherein the stop rods (15) have spherical end portions and are slidably embedded in the stop slots (16); a diameter of the spherical end portion of each stop rod (15) is greater than a width of an opening of each stop slot (16); and the stop rods (15) are distributed circumferentially in the tooth rings (14).

4. The rolling ring shrink fitting tool for the rotary equipment according to claim 1, wherein the supporting seats (19) abut against and slide in the shrink fitting plates (12) through the supporting screw rods (17); the supporting seats (19) are distributed in the shrink fitting plates (12) at an equal angle; and the supporting plate (20) at one end of each supporting seat (19) is of an arc-shaped structural design.

5. The rolling ring shrink fitting tool for the rotary equipment according to claim 1, wherein the positioning rods (23) and the stop plates (21) are perpendicular to each other; each entire positioning rod (23) is of a cylindrical structural design; and an end portion of each positioning rod (23) is of a circular truncated cone structural design.

6. The rolling ring shrink fitting tool for the rotary equipment according to claim 1, wherein a cross section of each push seat (27) is of an "L"-shaped structural design; a front section of the push plate (29) at the bottom of each push seat (27) is of an "L"-shaped structural design; and the two push seats (27) are symmetrically arranged on a bottom portion of the top of the lifting frame (1).

7. The rolling ring shrink fitting tool for the rotary equipment according to claim 1, wherein a top of each adjustment screw rod (28) is connected with a gear sleeve (281); the gear sleeves (281) are movably embedded in the push seats (27); one side of each gear sleeve (281) is engaged with a rack (282); the racks (282) are fixed on a side wall of the movement slot (2); and the racks (282) are parallel to the push seats (27).

* * * * *